(12) United States Patent
Park et al.

(10) Patent No.: US 7,679,827 B2
(45) Date of Patent: Mar. 16, 2010

(54) INTEGRAL OPTICAL PLATE, AND BACKLIGHT ASSEMBLY AND LIQUID CRYSTAL DISPLAY APPARATUS HAVING THE SAME

(75) Inventors: Jheen-Hyeok Park, Seongnam-si (KR); Dong-Hoon Kim, Seoul (KR); Jin-Sung Choi, Cheonan-si (KR); Tae-Seok Jang, Seoul (KR); Jeong-Hwan Lee, Suwon-si (KR)

(73) Assignee: Samsung Electronics Co., Ltd, Suwon-Si, Gyeonggi-Do (KR)

( * ) Notice: Subject to any disclaimer, the term of this patent is extended or adjusted under 35 U.S.C. 154(b) by 273 days.

(21) Appl. No.: 11/765,282

(22) Filed: Jun. 19, 2007

(65) Prior Publication Data
US 2007/0297062 A1    Dec. 27, 2007

(30) Foreign Application Priority Data
Jun. 21, 2006    (KR)    ...................... 10-2006-0055665

(51) Int. Cl.
G02B 27/10    (2006.01)
G02F 1/1335    (2006.01)
(52) U.S. Cl. .................. 359/619; 359/621; 349/64; 349/95
(58) Field of Classification Search ....................... None
See application file for complete search history.

(56) References Cited

U.S. PATENT DOCUMENTS

| | | | | |
|---|---|---|---|---|
| 6,295,104 B1 * | 9/2001 | Egawa et al. | ................... | 349/63 |
| 6,864,862 B2 * | 3/2005 | Sato et al. | ...................... | 345/32 |
| 2003/0184993 A1 * | 10/2003 | Yamada | ........................ | 362/31 |

FOREIGN PATENT DOCUMENTS

JP    2000314925 A    * 11/2000

* cited by examiner

Primary Examiner—Omar Rojas
(74) Attorney, Agent, or Firm—F. Chau & Associates, LLC

(57) ABSTRACT

An integral optical plate includes a convex lens plate, a microlens sheet and an adhesion element. The convex lens plate includes a first light incident surface into which light is incident and a first light-exiting surface disposed opposite the first light incident surface and on which a convex tens pattern is formed. The microlens sheet is disposed on the first light-exiting surface, and includes a microlens pattern. The adhesion element is disposed between the convex lens plate and the microlens sheet to combine the convex lens plate with the microlens sheet. The convex tens pattern includes a plurality of convex in lenses having a stripe shape extending lengthwise along the convex lens plate.

20 Claims, 9 Drawing Sheets

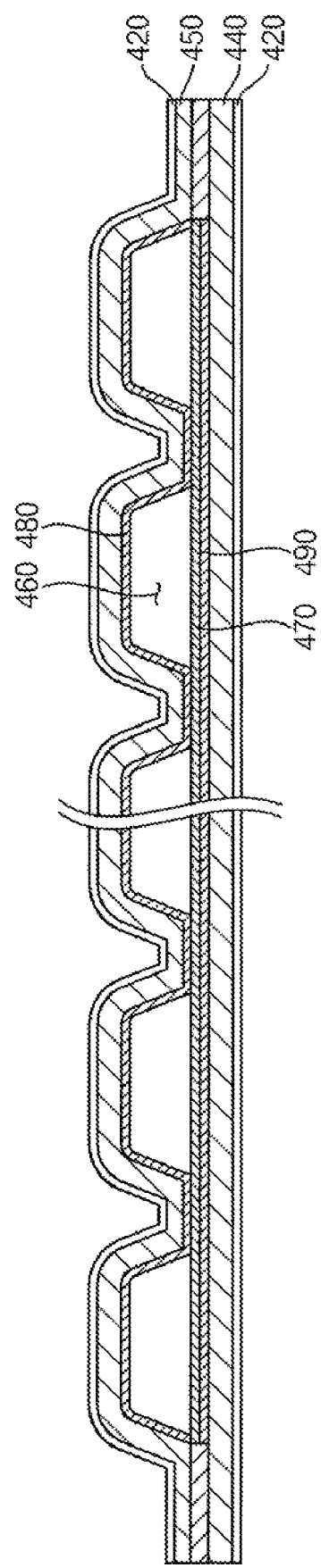

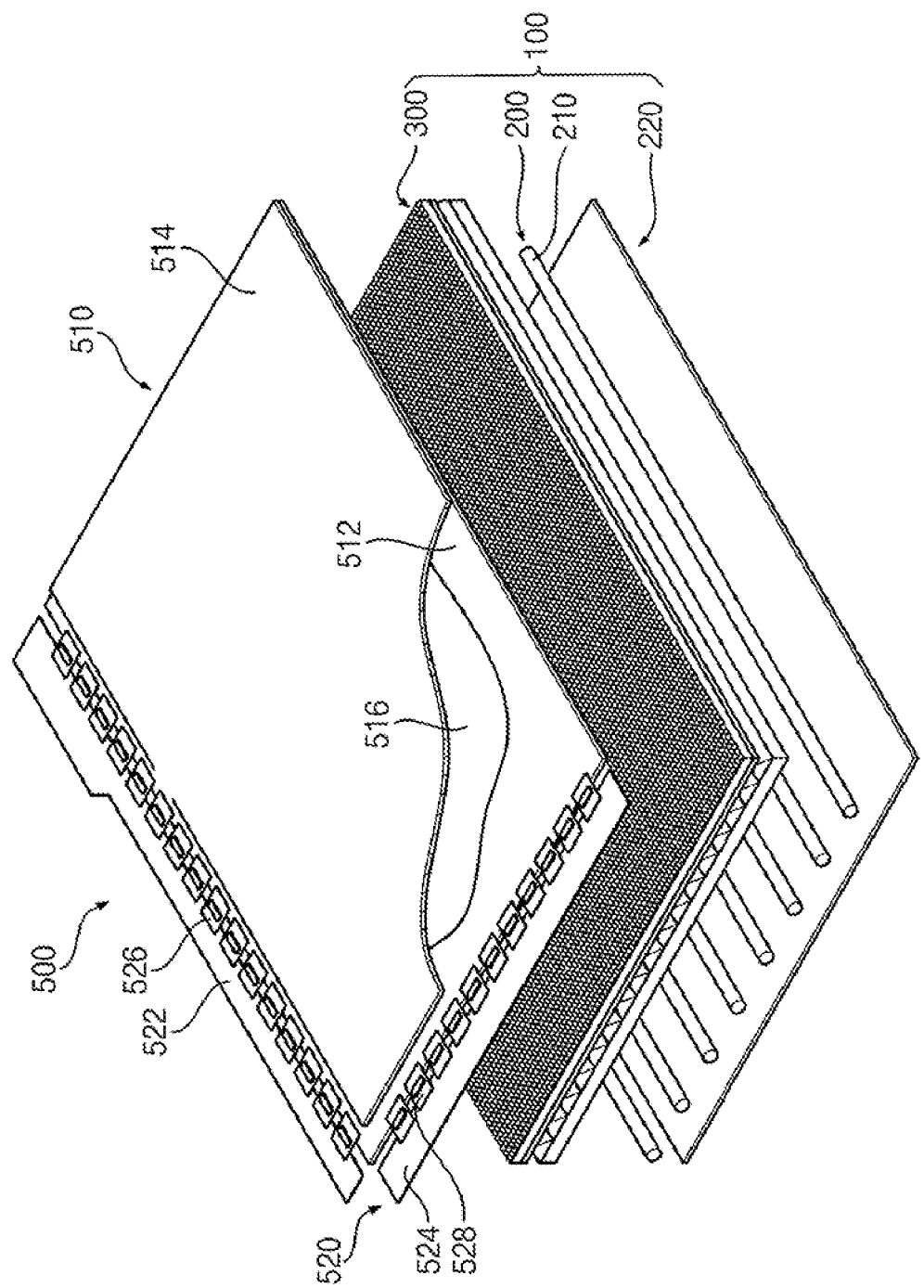

INTEGRAL OPTICAL PLATE, AND BACKLIGHT ASSEMBLY AND LIQUID CRYSTAL DISPLAY APPARATUS HAVING THE SAME

CROSS-REFERENCE TO RELATED APPLICATIONS

This application claims priority under 35 U.S.C. § 119 to Korean Patent Application No. 2006-55665, filed on Jun. 21, 2006 in the Korean Intellectual Property Office (KIPO), the contents of which are herein incorporated by reference in their entirety.

BACKGROUND OF THE INVENTION

1. Field of the Invention

The present invention relates to an integral optical plate, and a backlight assembly and a liquid crystal display apparatus having the integral optical plate.

2. Description of Related Art

A liquid crystal display (LCD) is a type of flat display apparatus displaying an image using liquid crystal. LCDs are typically thinner and lighter than other types of display apparatuses, and have low driving voltage and low power consumption. Therefore, LCDs are widely used.

A typical LCD apparatus includes an LCD panel and a separate backlight assembly that provides light to the LCD panel.

The backlight assembly used for large-size products such as TVs and so on, includes a light source disposed under the LCD panel and optical elements, such as a diffusion plate, a diffusion sheet, a prism sheet, and a reflective polarizing sheet, disposed between the light source and the LCD panel, for enhancing luminance.

However, since a variety of optical elements are used in the LCD apparatus, manufacturing costs are high, and optical and assembling efficiencies are low.

SUMMARY OF THE INVENTION

An integral optical plate according to an exemplary embodiment of the present invention includes a convex lens plate, a microlens sheet and an adhesion element. The convex tens plate has a first light incident surface and a first light-exiting surface, light is incident into the first light incident surface, the first light-exiting surface is disposed opposite the first light incident surface, and a convex lens pattern is formed on the first light-exiting surface. The microlens sheet is disposed on the first light-exiting surface having the convex lens pattern, and a microlens pattern is formed on the microlens sheet. The adhesion element is disposed between the convex lens plate and the microlens sheet to combine the convex lens plate with the microlens sheet.

The convex lens pattern includes a plurality of convex lenses having a stripe shape that extends lengthwise along the convex tens plate. Each convex lens includes first and second inclined surfaces, and a curved surface. A separation distance between the first and second inclined surfaces becomes narrower from lower ends to upper ends of the first and second inclined surfaces. The curved surface connects the upper end of the first inclined surface to the upper end of the second inclined surface, A cross-sectional surface perpendicular to a longitudinal arrangement direction of the convex lens has a half-circular shape or a trapezoid shape.

The microlens sheet includes a second light incident surface facing the convex lens plate and a second light-exiting surface being disposed opposite the second light incident surface. The microlens pattern is formed on the second in light-exiting surface. The microlens pattern may have a structure in which diffusion beads are fixed by a binder, and may have a micro concavo-convex structure that is formed irregularly.

The adhesion element has substantially the same refractive index as that of the microlens sheet.

A backlight assembly according to an exemplary embodiment of the present invention includes a light-emitting unit, and an integral optical plate disposed over the light-emitting unit for condensing and diffusing light from the light-emitting unit. The integral optical plate includes a convex lens plate a microlens sheet and an adhesion element. The convex lens plate including a first light incident surface facing the light-emitting unit and a first light-exiting surface being disposed opposite the first light incident surface, a convex lens pattern being formed on the first light-exiting surface. The microlens sheet is disposed on the first light-exiting surface having the convex tens pattern, and a microlens pattern being formed on the microlens sheet, and the adhesion element is disposed between the convex lens plate and the microlens sheet for combining the convex lens plate with the microlens sheet.

An LCD apparatus according to an exemplary embodiment of the present invention includes a backlight assembly having a light-emitting unit for emitting light, and an integral optical plate disposed over the tight-emitting unit, and an LCD panel displaying an image using the light from the backlight assembly. The integral optical plate includes a convex lens plate, a microlens sheet and an adhesion element. The convex tens plate includes a first light incident surface facing the light-emitting unit and a first light-exiting surface being disposed opposite the first light incident surface, a convex lens pattern being formed on the first light-exiting surface and including a plurality of convex lenses having a stripe shape that extends lengthwise along the convex lens plate. The microlens sheet includes a second light incident surface facing the first light-exiting surface and a second light-exiting surface being disposed opposite the second light incident surface, a microlens pattern being formed on the second light-exiting surface. The adhesion element is disposed between the first light-exiting surface and the second light incident surface, for combining the convex lens plate with the microlens sheet.

BRIEF DESCRIPTION OF THE DRAWINGS

The present invention will become more apparent by describing in detailed exemplary embodiments thereof with reference to the accompanying drawings, in which:

FIG. 10 is a cross-sectional view of a flat fluorescent lamp taken along a line I-I' of FIG. 1; and FIG. 11 is an exploded perspective view illustrating a liquid crystal display (LCD) apparatus according an exemplary embodiment of the present invention.

DETAILED DESCRIPTION OF PREFERRED EMBODIMENTS

Figure 1:
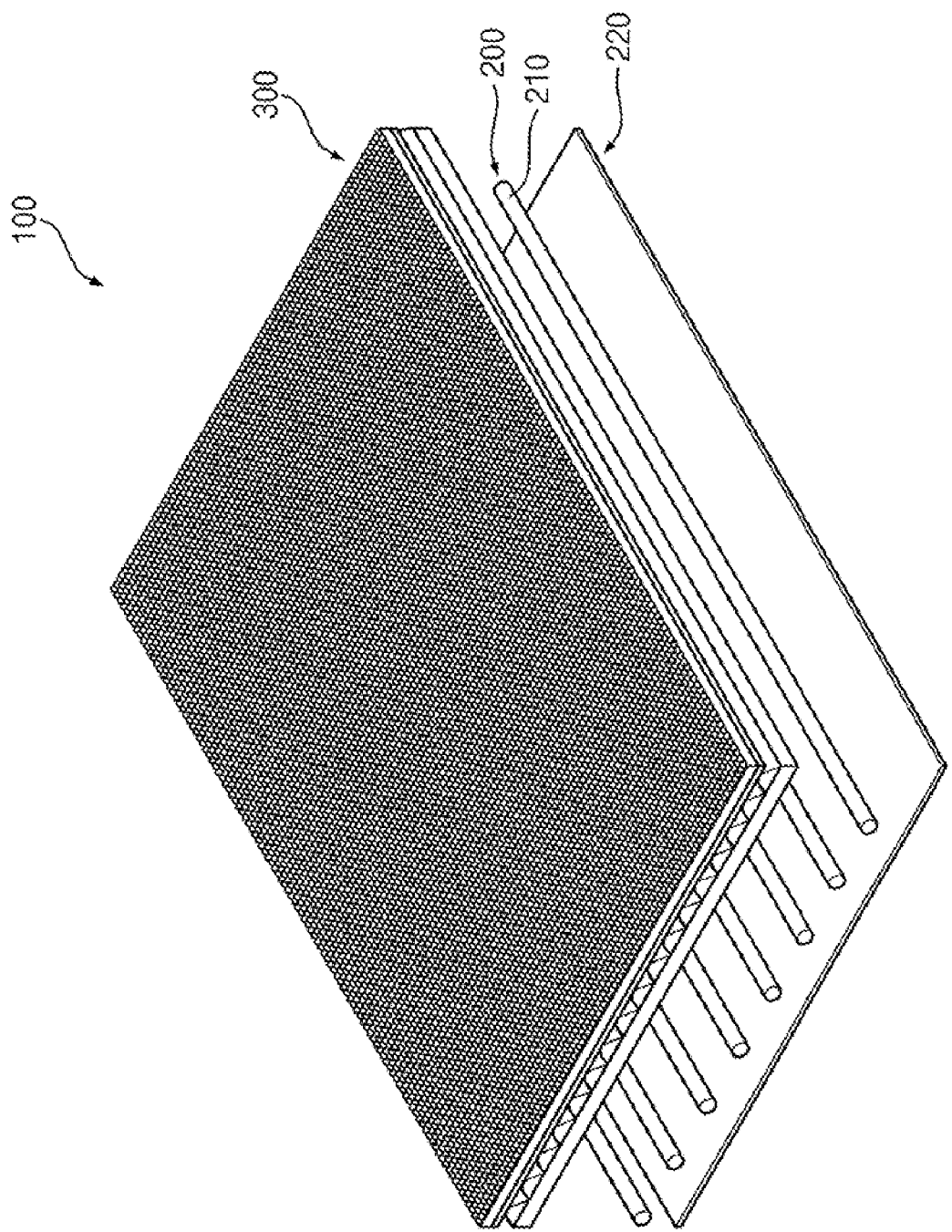
FIG. 1 is a perspective view illustrating a backlight assembly according to an exemplary embodiment of the present invention.

The invention is described more fully hereinafter with reference to the accompanying drawings, in which exemplary embodiments of the invention are shown. This invention may, however, be embodied in many different forms and in should not be construed as limited to embodiments set forth herein. Rather, embodiments are provided so that this disclosure will be thorough and complete, and will fully convey the scope of the invention to those skilled in the art. In the drawings, the size and relative sizes of layers and regions may be exaggerated for clarity.

Hereinafter, exemplary embodiments of the present invention will be explained in detail with reference to the accompanying drawings.

FIG. 1 is a perspective view illustrating a backlight assembly according to an exemplary embodiment of the present invention.

Referring to FIG. 1, the backlight assembly 100 according to the exemplary embodiment includes a light-emitting unit 200 for emitting light, and an integral optical plate 300 being disposed over the light-emitting unit 200.

The light-emitting unit 200 includes a plurality of fluorescent lamps 210. The fluorescent lamps 210 are disposed substantially in parallel under the integral optical plate 300 for generating light in response to a driving signal applied from an external inverter.

The fluorescent lamps 210 may include cold cathode fluorescent lamps (CCFLs) having a slim and long cylindrical shape. Alternatively, the fluorescent lamps 210 may have a curved U-shape. The fluorescent lamps 210 may include external electrode fluorescent lamps (EEFLs), wherein an electrode is formed on an outside surface of both edges of each of the EEFLs. Preferably, the fluorescent lamps 210 are disposed at a constant interval, to maintain a uniform luminance of the backlight assembly 100.

A reflective plate 220 is disposed under the light-emitting unit 200 having the fluorescent lamps 210. The reflective plate 220 reflects the light of the fluorescent lamps 210 in a direction of the integral optical plate 300, to enhance optical efficiency.

The integral optical plate 300 is disposed over the light-emitting unit 200, for condensing and diffusing the light incident from the light-emitting unit 200.

Figure 2:
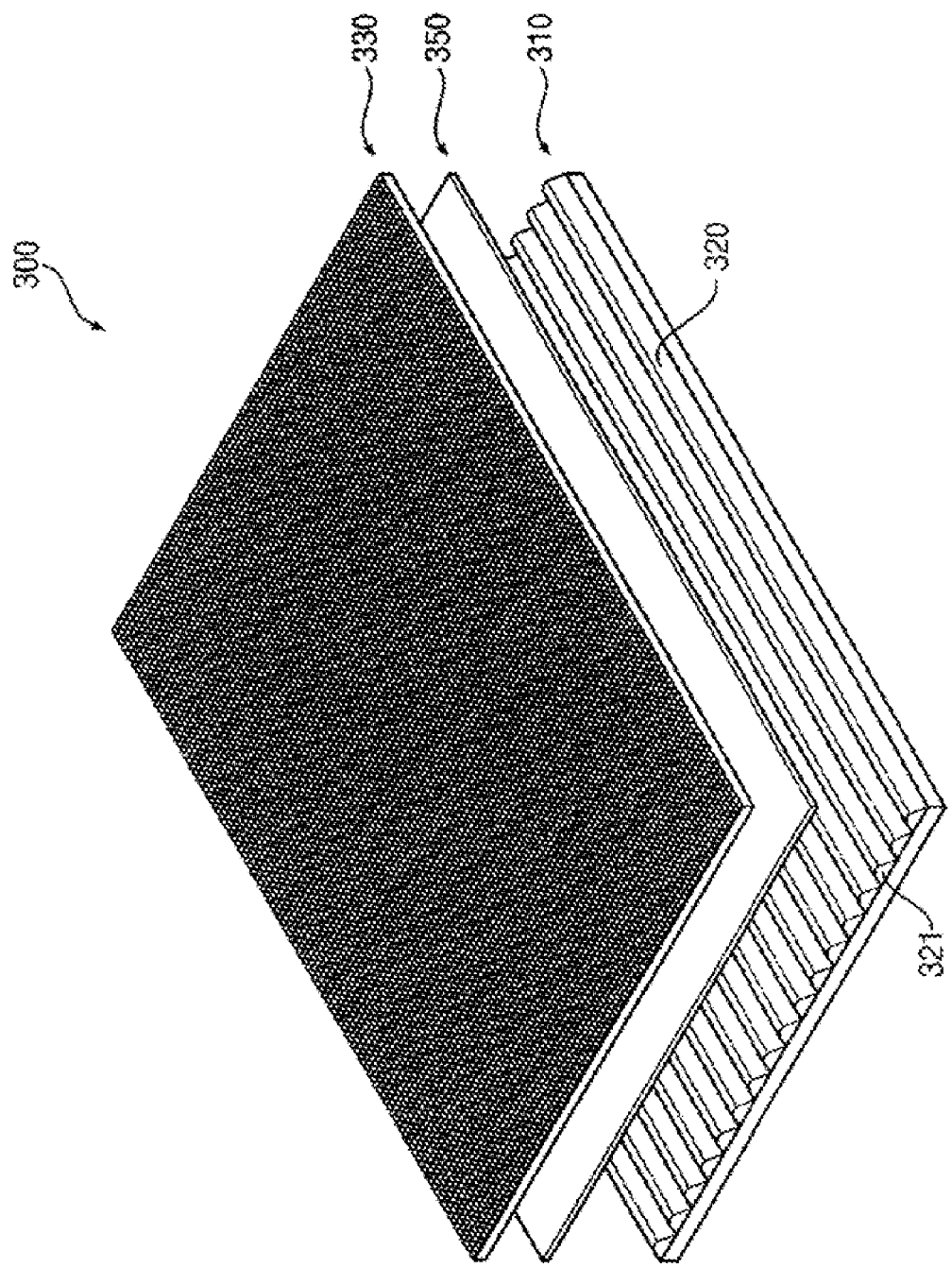
FIG. 2 is an exploded perspective view illustrating an integral optical plate in FIG. 1.
Figure 3:
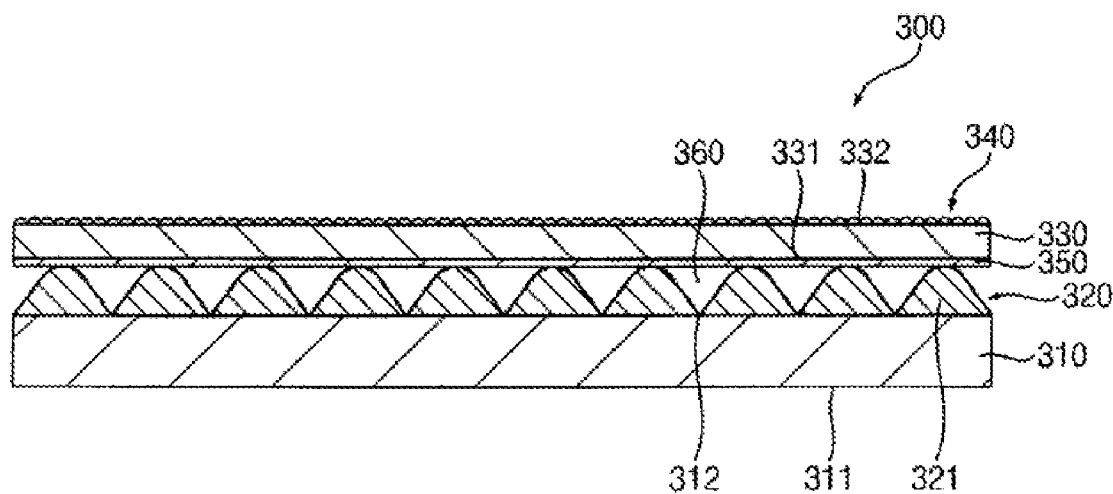
FIG. 3 is a cross-sectional view illustrating a cross-section of the integral in optical plate in FIG. 1.

FIG. 2 is an exploded perspective view illustrating the integral optical plate 300 in FIG. 1, and FIG. 3 is a cross-sectional view illustrating a cross-section of the integral optical plate 300 in FIG. 1.

Referring to FIGS. 2 and 3, the integral optical plate 300 includes a convex lens plate 310, a microlens sheet 330 and an adhesion element 350.

The convex lens plate 310 includes a first light incident surface 311 and a first light-exiting surface 312. The light from the light-emitting unit 200 is incident on the first light incident surface 311. The first light-exiting surface 312 is disposed opposite the first light incident surface 311, and a convex lens pattern 320 is formed on the first light-exiting surface 312.

The convex lens plate 310 includes a transparent material, for decreasing light loss. An example of a material that may be used for the convex lens plate 310 is polymethyl methacrylate (PMMA). Alternatively, a material used for the convex tens plate 310 may include polycarbonate (PC), having greater thermal resistance than the PMMA. The convex lens plate 310 may include a haze, for decreasing lines due to the fluorescent lamps 210.

The first light incident surface 311 of the convex lens plate 310 on which the light is incident, includes a smooth surface. The first light-exiting surface 312 includes a concavo-convex structure on which the convex lens pattern 320 is formed, for condensing the light.

The convex lens pattern 320 includes a plurality of convex lenses 321 having a stripe shape that extends lengthwise along the convex lens plate 310. The convex lenses 321 extend along substantially the same direction as a lengthwise direction of the fluorescent lamps 210. The convex lenses 321 may be uniformly and sequentially disposed on the entire surface of the first light-exiting surface 312. Alternatively, the convex lenses 321 may be separately disposed from each other at a substantially constant interval.

The microlens sheet 330 is disposed on the first tight-exiting surface 312 having the convex lens pattern 320. The microlens sheet 330 includes a second light incident surface 331 facing the first light-exiting surface 312 of the convex lens plate 310, and a second light-exiting surface 332 opposite the second light incident surface 331.

The microlens sheet 330 is formed to have a thinner thickness than that of the convex lens plate 310. Examples of a material that may be used for the microlens sheet 330 include polyethylene terephthalate (PET) or PC.

The microlens sheet 330 includes a microlens pattern 340 formed on the second light-exiting surface 332, for condensing and diffusing light. The microlens pattern 340 includes a micro concavo-convex structure irregularly formed over the entire second light-exiting surface 332. The micro concavo-convex structure is formed with a smaller size than that of the convex lenses 321 on the convex tens plate 310. For example, the microlens pattern 340 may include various micro concavo-convex structures, such as those of a half-sphere, a cone, a polygonal cone and so on, and a size of the micro concavo-convex structure may be between about 5 µm to about 10 µm. The microlens pattern 340 may be formed by a sand blast process, etc. Alternatively, the microlens pattern 340 may be partially formed on positions corresponding to the fluorescent lamps 210, for decreasing the lines due to the fluorescent lamps 210.

The adhesion element 350 is disposed between the convex lens plate 310 and the microlens sheet 330, for combining the convex lens plate 310 and the microlens sheet 330. For example, the adhesion element 350 may be an adhesive layer that is formed by a pressure swing absorption (PSA) process, or may include a double-sided adhesion sheet having a low glass transition temperature (TG).

Preferably, the adhesion element 350 may have a similar refractive index to that of the microlens sheet 330, for minimizing refraction in an adhesive interface between the adhesion element 350 and the microlens sheet 330. Preferably, the adhesion element 350 may have substantially the same refractive index as that of the microlens sheet 330. For example, the adhesion element 350 is formed by a material having the refractive index between about 1.1 to about 1.7.

Preferably, the adhesion element 350 may have a transmissive ratio of more than about 95%, for decreasing the light loss. The adhesion element 350 may include a haze, for decreasing the lines due to the fluorescent lamps 210.

When the convex lens plate 310 and the microlens sheet 330 are integrally formed by the adhesion element 350, an air gap 360 is formed between the convex lens plate 310 and the adhesion element 350 due to the convex lens pattern 320.

Figure 4:
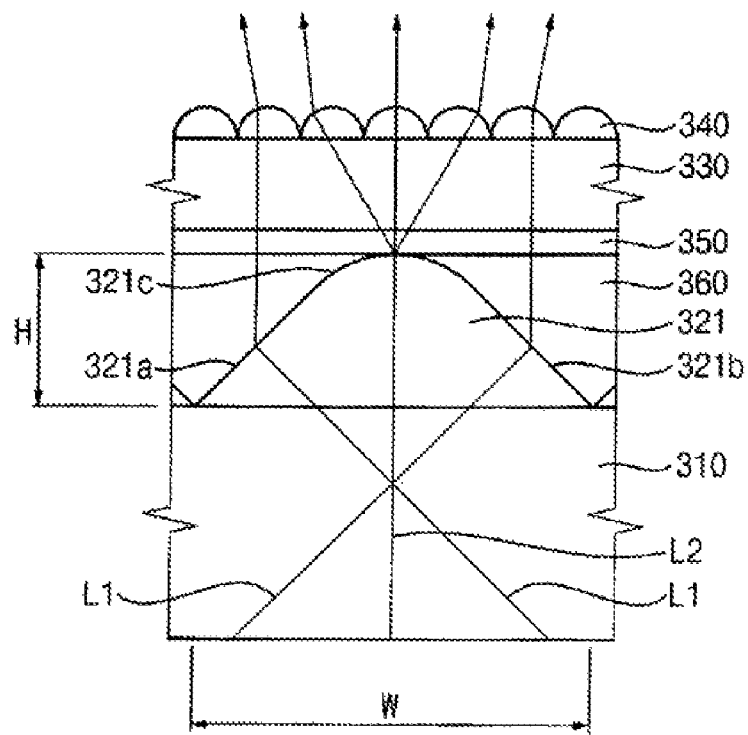
FIG. 4 is a cross-sectional view particularly illustrating the integral optical plate in FIG. 3.

FIG. 4 is a cross-sectional view illustrating the integral optical plate in FIG. 3.

Referring to FIGS. 3 and 4, the convex lenses 321 are formed on the first light-exiting surface 312 of the convex lens plate 310.

Each of the convex lenses 321 has a triangular prism shape with a rounded upper side. For example, each of the convex lenses 321 is formed to have a width between about 50 µm to about 100 µm, and a height between about 20 µm to about 25 µm.

Each of the convex lenses 321 includes a first inclined surface 321a, a second inclined surface 321b and a curved surface 321c.

A separation distance between the first inclined surface 321a and the second inclined surface 321b becomes narrower from a lower end to an upper end, so that the first and second inclined surfaces 321a and 321b are formed to be inclined. For example, the first and second inclined surfaces 321a and 321b have inclination angles between about 30° to 60°.

The curved surface 321c connects the upper end of the first inclined surface 321a to the upper end of the second inclined surface 321b. The curved surface 321c includes a convex surface rounded in an upper direction, to have a predetermined curvature. Alternatively, the curved surface 321c may include a concave surface rounded in a lower directions to have the predetermined curvature.

Condensing and diffusing efficiencies of the convex lenses 321 depend on the curvature of the curved surface 321c. For example, when the curved surface 321c is formed to have a large curvature, the condensing efficiency is more enhanced than the diffusing efficiency, and when the curved surface 321c is formed to have a small curvature, the diffusing efficiency is more enhanced than the condensing efficiency. Thus, the curvature of the curved surface 321c may be determined according to an application of the integral optical plate 300 and desired light properties.

A light beam L1, traveling at an incline from the first light incident surface 311 of the convex lens plate 310 to the first light-exiting surface 312 of the convex lens plate 310, is condensed by the first inclined surface 321a and the second inclined surface 321b of each of the convex lenses 321 to the upper direction, passes through the air gap 360, the adhesion element 350 and the microlens sheet 330, and exits without substantial refraction. Since the first and second inclined surfaces 321a and 321b of each of the convex lenses 321 contact the air gap 360, and have a refractive index different from that of the air gap 360, most of the light that passes through an interface between the first and second inclined surfaces 321a and 321b and the air gap 360 is refracted into the upper direction to be condensed. A light beam L2 vertically advances from the in first light incident surface 311 of the convex lens plate 310 to the first light-exiting surface 312 of the convex lens plate 310, and is condensed by the microlens pattern 340.

The integral optical plate 300 forms the air gap 360 between the convex lens plate 310 and the adhesion element 350, for condensing the light that has passed through the convex lens plate 310. In addition, the microlens sheet 330, having condensing and diffusion functions, condenses and diffuses the light that has passed through the convex lens plate 310. Therefore, light loss and the lines may be decreased, so that a total thickness of the backlight assembly 100 may be decreased.

Figure 5:
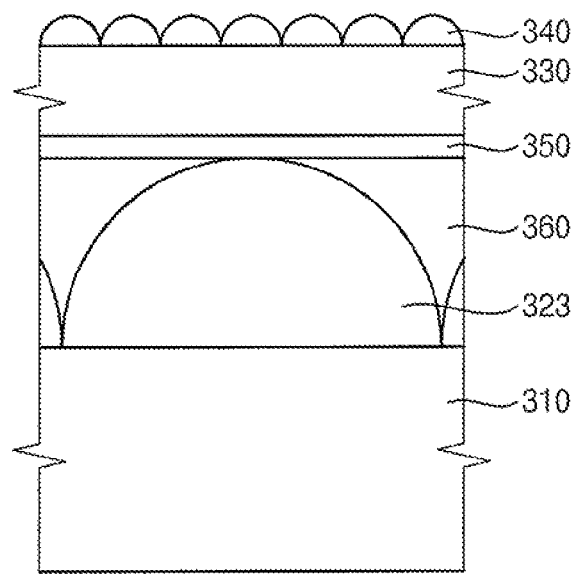
FIG. 5 is a cross-sectional view illustrating an integral optical plate according to another exemplary embodiment of the present invention.

FIG. 5 is a cross-sectional view illustrating an integral optical plate 300 according to another exemplary embodiment of the present invention.

Referring to FIGS. 3 and 5, the convex lens pattern 320 including a plurality of convex lenses 323 is formed on the first light-exiting surface 312 of the convex lens plate 310. A cross-sectional area perpendicular to a longitudinal arrangement direction of each of the convex lenses 323 has a half-elliptical shape. Therefore, the air gap 360 is formed between the convex lens plate 310 and the adhesion element 350.

When each of the convex lenses 323 has the half-elliptical shape, condensing efficiency may be lower than that of the convex lens pattern 320 having the convex lenses 321 illustrated in FIG. 4, but since the integral optical plate 300 includes the air gap 360, the condensing efficiency may still be enhanced.

The integral optical plate 300 of FIG. 5 is substantially the same as in FIG. 4, except for the shape of the convex lenses 323. Thus, the same reference numerals will be used to refer to the same or like parts as those previously described and any further repetitive explanation concerning the above elements will be omitted.

Figure 6:
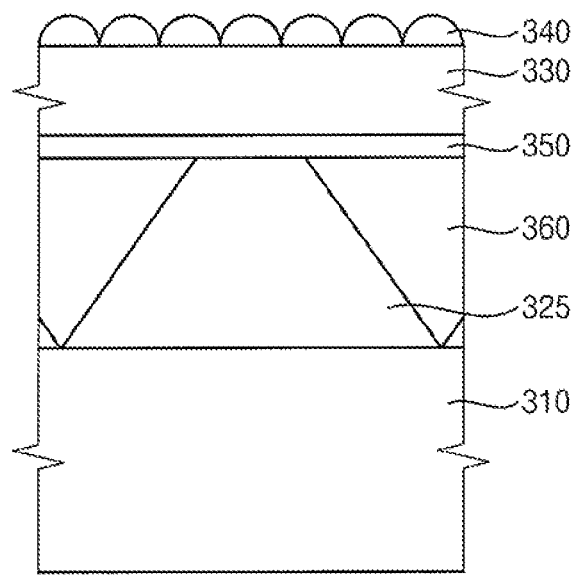
FIG. 6 is a cross-sectional view illustrating an integral optical plate according to still another exemplary embodiment of the present invention.

FIG. 6 is a cross-sectional view illustrating an integral optical plate 300 according to still another exemplary embodiment of the present invention.

Referring to FIG. 6, a cross-sectional area perpendicular to a longitudinal arrangement direction of each of a plurality of convex lenses 325 has a trapezoid shape. When each of the convex lenses 325 has the trapezoid shape, the condensing efficiency may be enhanced by an inclined surface in each of the convex lenses 325. In addition, since an upper surface of each of the convex lenses 325 is flat, each of the convex lenses 325 may be more stably combined with the microlens sheet 330 in comparison with convex tenses having a convex upper surface.

The integral optical plate 300 of FIG. 6 is substantially the same as in FIG. 4, except for the shape of the convex lens 325. Thus, the same reference numerals wilt be used to refer to the same or like parts as those previously described and any further repetitive explanation concerning the above elements will be omitted.

Figure 7:
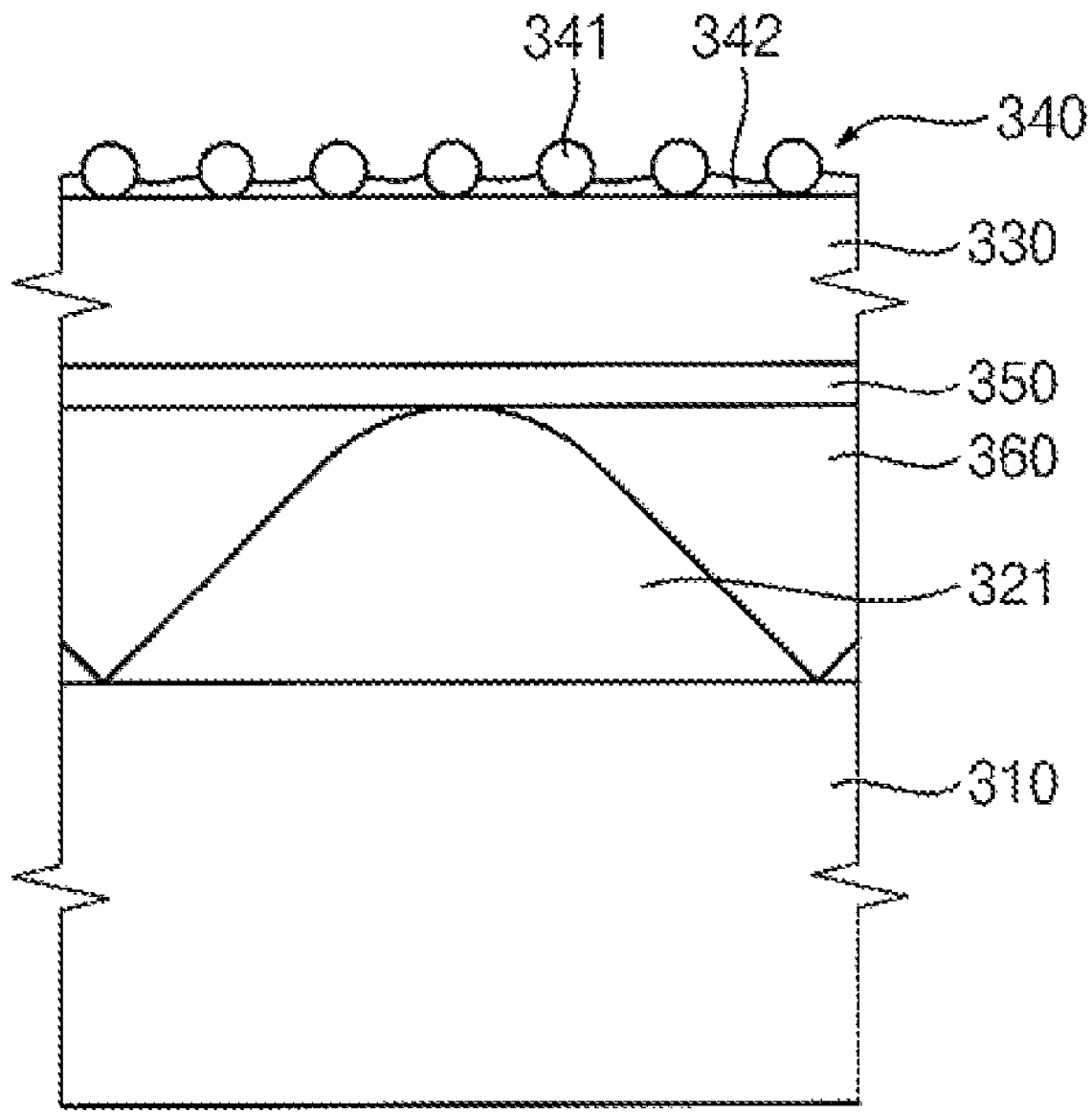
FIG. 7 is a cross-sectional view illustrating an integral optical plate according to still another exemplary embodiment of the present invention.

FIG. 7 is a cross-sectional view illustrating an integral optical plate 300 according to still another exemplary embodiment of the present invention.

Referring to FIGS. 3 and 7, a microlens pattern 340 is formed on the second light-exiting surface 332 of the microlens sheet 330 for condensing and diffusing the light. The microlens pattern 340 has a structure in which diffusion beads 341 are fixed to a binder 342. The diffusion beads 341 may be formed of PMMA, and a particle size of the diffusion beads 341 is between about 5 µm and about 10 µm. Examples of a material that may be used for the binder 342 include a thermosetting resin or a photopolymer resin. The binder 324 fixes the diffusion beads 341 on the second light-exiting surface 332 of the microlens sheet 330.

Since the diffusion beads 342, fixed by the binder 342, protrude from the second light-exiting surface 332 by a predetermined height, a concavo-convex structure is formed on the second light-exiting surface 332, so that the diffusion beads 342 performs the condensing and diffusing functions.

Figure 8:
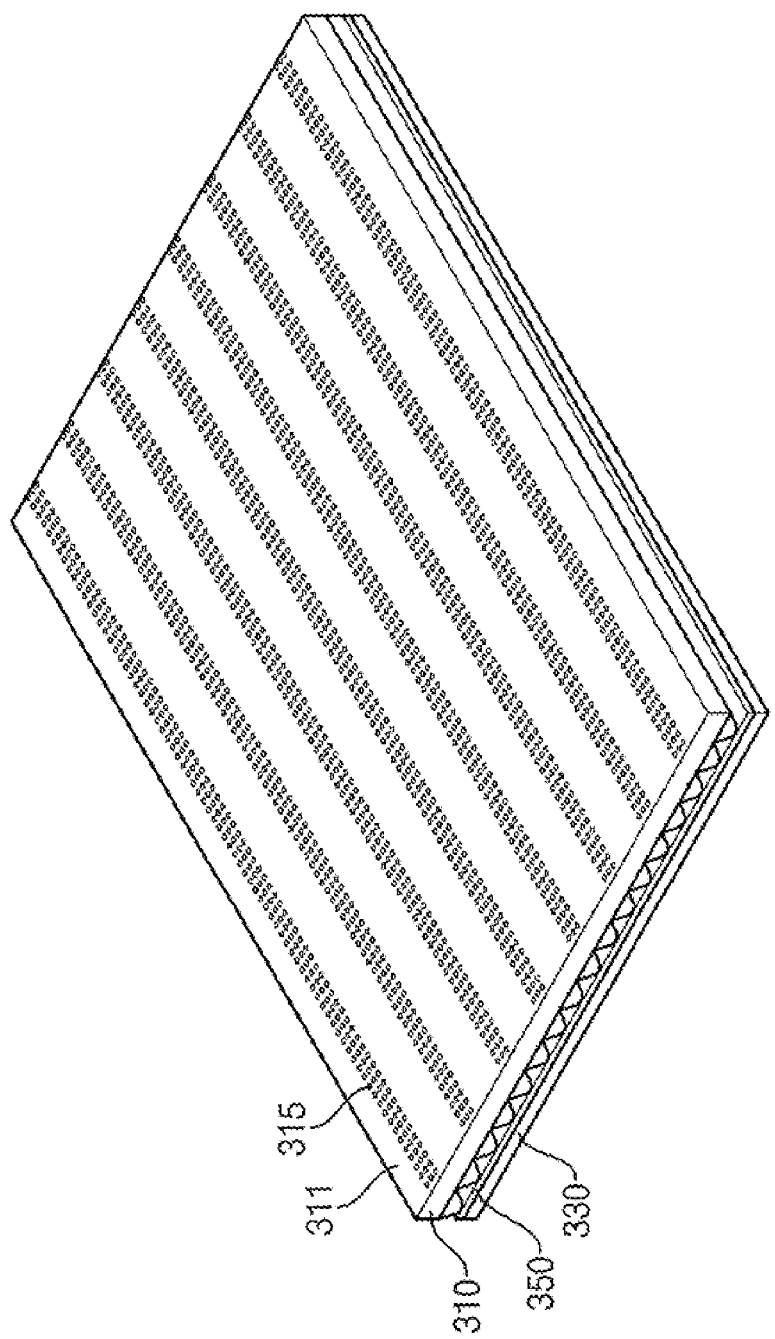
FIG. 8 is a perspective view illustrating an integral optical plate according to still another exemplary embodiment of the present invention.

FIG. 8 is a perspective view illustrating an integral optical plate according to still another exemplary embodiment of the present invention.

Referring to FIGS. 1 and 8, a diffusion pattern 315 is formed on a lower surface of the integral optical plate 300 facing the light-emitting unit 200, which is the first light incident surface 311 of the convex lens plate 310, for diffusing and reflecting the light incident from the light-emitting unit 200.

The diffusion pattern 315 is formed at each position corresponding to each of the fluorescent lamps 210, for decreasing the lines due to the fluorescent lamps 210. In addition, the diffusion pattern 315 may be formed with high densities on the positions corresponding to the fluorescent lamps 210, and may be formed with low densities on positions corresponding to spaces between adjacent fluorescent lamps 210.

The diffusion pattern 315 includes a printed pattern in which a white ink is formed into a dot shape. Alternatively, the diffusion pattern 315 may include a concavo-convex pattern in which a micro concavo-convex structure is formed into a dot shape.

The integral optical plate 300 of FIG. 8 is substantially the same as in FIGS. 4 to 7, except for the diffusion pattern 315. Thus, the same reference numerals will be used to refer to the same or like parts as those previously described and any further repetitive explanation concerning the above elements will be omitted.

Figure 9:
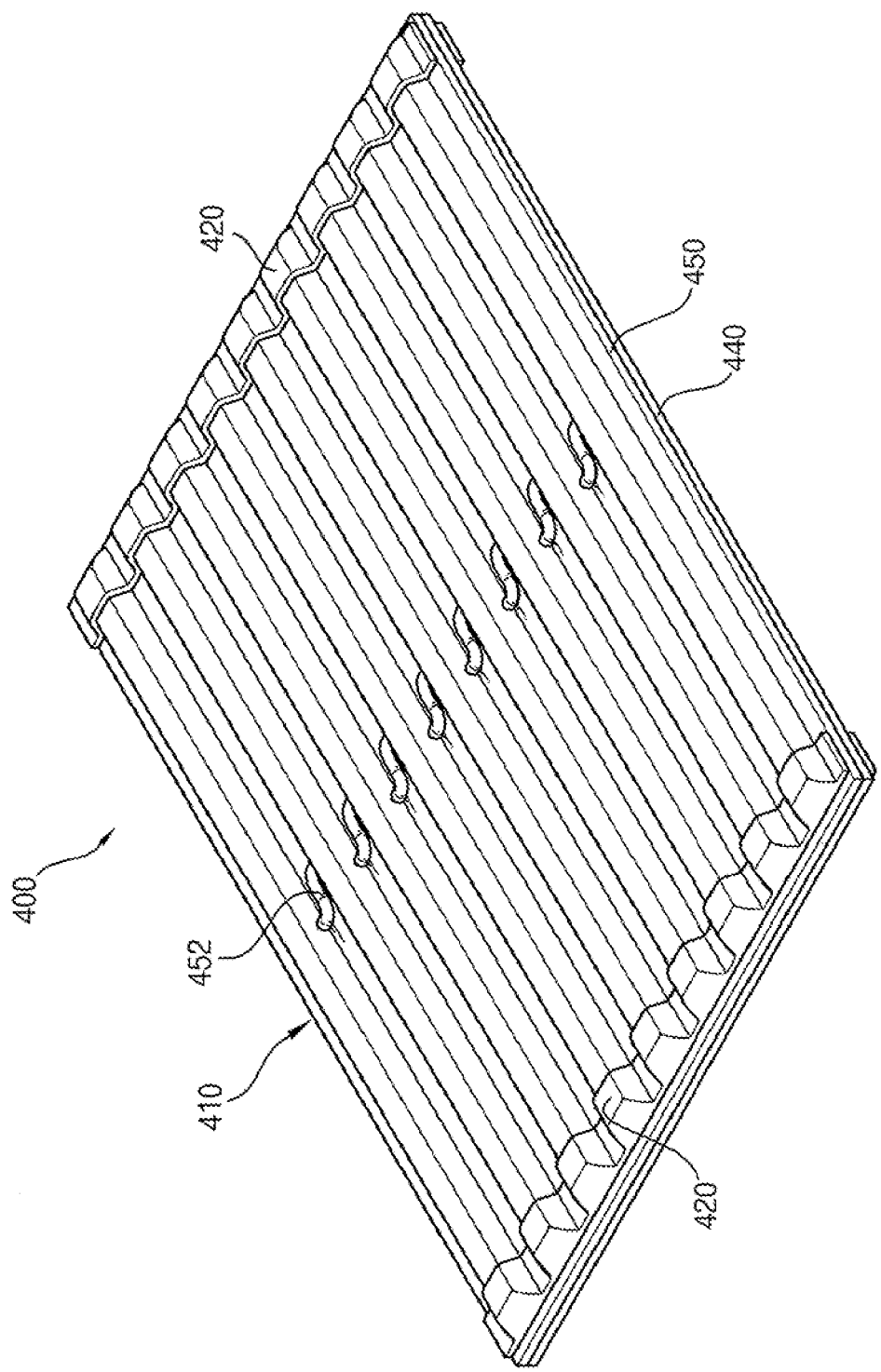
FIG. 9 is a perspective view illustrating light-emitting unit in FIG. 1 according to another exemplary embodiment of the present invention.

FIG. 9 is a perspective view illustrating the light-emitting unit in FIG. 1 according to another exemplary embodiment of the present invention, and FIG. 10 is a cross-sectional view of a flat fluorescent lamp taken along a line I-I' of FIG. 1.

Referring FIGS. 1, 9 and 10 the light-emitting unit 200 includes a flat fluorescent lamp 400 having substantially the same area as that of the integral optical plate 300.

The flat fluorescent lamp 400 includes a lamp body 410 and an electrode 420. The lamp body 410 is divided into a plurality of electric discharge spaces 460, for emitting the light. The electrode 420 is formed at both edges of the lamp body 410, for intersecting with each of the electric discharge spaces 460.

The lamp body 410 includes a first substrate 440 and a second substrate 450. The second substrate 450 is combined with the first substrate 440, and is molded for forming the plurality of electric discharge spaces 460. The lamp body 410 includes a rectangular shape, when viewed from a planar view, for emitting light in a shape of the surface of the lamp body 410.

The lamp body 410 induces a plasma electric discharge in the electric discharge spaces 460 using an electric discharge voltage applied from the external inverter to the electrode 420. The lamp body 410 changes an ultraviolet ray generated by the plasma electric discharge into a visible ray, to emit the visible ray to the exterior. Since the lamp body 410 has a broad emitting area, an inner space of the lamp body 410 is divided into the plurality of electric discharge spaces 460 to enhance emitting efficiency. For example, the inner space of the lamp body 410 may be divided into twenty-eight electric discharge spaces 460. A connecting path 452 is formed on the second substrate 450, for connecting adjacent electric discharge spaces 460.

The electrode 420 is formed to intersect all of the electric discharge spaces 460, for applying the electric discharge voltage to the plurality of electric discharge spaces 460. The electrode 420 is formed at both sides of a longitudinal arrangement direction of the electric discharge spaces 460. The electrode 420 is formed on an outer surface of the lamp body 410. Alternatively, the electrode 420 may be formed on an inner surface of the lamp body 410.

The flat fluorescent lamp 400 further includes a first fluorescent layer 470 and a second fluorescent layer 480. The first fluorescent layer 470 is formed on an inner surface of the first substrate 440 facing the second substrate 450. The second fluorescent layer 480 is formed on an inner surface of the second substrate 450 facing the first substrate 440. The first and second fluorescent layers 470 and 480 are excited by the ultraviolet ray generated by the plasma electric discharge in the electric discharge spaces 460, and emit the visible ray.

The flat fluorescent lamp 400 may further include a reflective layer 490 formed between the first substrate 440 and the first fluorescent layer 470. The reflective layer 490 reflects the visible ray that is emitted by the first and second fluorescent layers 470 and 480, to substantially prevent the visible ray from leaking from the first substrate 440.

FIG. 11 is an exploded perspective view illustrating a liquid crystal display (LCD) apparatus according an exemplary embodiment of the present invention.

Referring to FIG. 11, the LCD apparatus 600 includes the backlight assembly 100 for supplying the light and a display unit 500 for displaying an image.

The backlight assembly 100 may be substantially the same as in above-explained exemplary embodiments in FIGS. 1 to 10. Thus, the same reference numerals will be used to refer to the same or like parts as those previously described and any further repetitive explanation concerning the above elements will be omitted.

The display unit 500 includes an LCD panel 510 and a driving circuit part 520. The LCD panel 510 displays the image using the light supplied by the backlight assembly 100. The driving circuit part 520 drives the LCD panel 510.

The LCD panel 510 includes a first substrate 512, a second substrate 514 facing the first substrate 512, and a liquid crystal layer 516 interposed between the first and second substrates 512 and 514. The liquid crystal layer 516 includes liquid crystal molecules.

The first substrate 512 includes a thin-film transistor (TFT) substrate on which a plurality of TFTs as switching elements is formed in a matrix shape. A source terminal of each of the TFTs is connected to a data line, a gate terminal of each of the TFTs is connected to a gate line, and a drain terminal of each of the TFTs is connected to a pixel electrode, the pixel electrode including a transparent conductive material.

The second substrate 514 includes a color filter substrate on which a plurality of red-green-blue (RGB) color fitters for displaying a color is formed in a thin film shape. A common electrode including the transparent conductive material is formed on the second substrate 514. Alternatively, the RGB color filters may be formed on the first substrate 512.

The driving circuit part 520 includes a data printed circuit board (PCB) 522 for supplying a data driving signal to the LCD panel 510, a gate PCB 524 for supplying a gate driving signal to the LOP panel 510, a data driving circuit film 526 connecting the data PCS 522 to the LCD panel 510, and a gate driving circuit film 528 connecting the gate PCB 524 to the LCD panel 510.

The data driving circuit film 526 and the gate driving circuit film 528 include a tape carrier package (TCP) or a chip-on-film (COF) on which a data driving chip and a gate driving chip are mounted. Alternatively, the gate PCS 524 may be removed by forming an additional signal line on the LCD panel 510 and the gate driving circuit film 528.

When the gate driving signal is applied to the gate terminal of the TFT, for the TFT to be turned on, the date driving signal is applied to the pixel electrode, and an electric field is generated between the pixel electrode and the common electrode. A longitudinal arrangement direction of liquid crystal molecules between the first and second substrates 512 and 514 is changed by the electric field. According to the change of the longitudinal arrangement direction of liquid crystal molecules, light transmittance of the light supplied from the backlight assembly 100 is changed, so that a gray scale image may be displayed.

According to an embodiment of the present invention, the integral optical plate includes the convex lens plate having the convex lens pattern, the microlens sheet having the microlens pattern and the air gap formed between the convex lens plate and the microlens sheet, so that the integral optical plate may have the condensing and diffusing functions simultaneously and may enhance the light efficiency.

In addition, the lines may be decreased by the microlens sheet, so that a product's thickness may be decreased.

In additions an additional optical sheet excluding the integral optical plate may be removed, so that manufacturing costs may be decreased, optical and assembly efficiencies may also be enhanced.

Having described the exemplary embodiments of the present invention and its advantage, it is noted that various changes, substitutions and alterations can be made herein without departing from the spirit and scope of the disclosure.

What is claimed is:

1. An integral optical plate comprising:
   a convex lens plate having a first light incident surface receiving light and a first light-exiting surface disposed opposite the first light incident surface, a convex lens pattern being formed on the first light-exiting surface;
   a microlens sheet disposed on the first light-exiting surface having the convex lens pattern, a microlens pattern being formed on the microlens sheet; and
   an adhesion element disposed between the convex lens plate and the microlens sheet to combine the convex lens plate with the microlens sheet,
   wherein an air gap is formed between the convex lens plate and the adhesion element.

2. The integral optical plate of claim 1, wherein the convex lens pattern includes a plurality of convex lenses having a stripe shape that extends lengthwise along the convex lens plate.

3. The integral optical plate of claim 2, wherein the convex lens comprises:
   first and second inclined surfaces, a separation distance between the first and second inclined surfaces becoming narrower from lower ends to upper ends of the first and second inclined surfaces; and
   a curved surface for connecting the upper end of the first inclined surface to the upper end of the second inclined surface.

4. The integral optical plate of claim 2, wherein a cross-sectional surface substantially perpendicular to a longitudinal arrangement direction of the convex lens has a half-circular shape.

5. The integral optical plate of claim 2, wherein the cross-sectional surface substantially perpendicular to a longitudinal arrangement direction of the convex lens has a trapezoid shape.

6. The integral optical plate of claim 1, wherein the microlens sheet includes a second light incident surface facing the convex lens plate and a second light-exiting surface disposed opposite the second light incident surface, and the microlens pattern is formed on the second light-exiting surface.

7. The integral optical plate of claim 6, wherein the microlens pattern has a structure in which diffusion beads are fixed by a binder.

8. The integral optical plate of claim 6, wherein the microlens pattern has a micro concavo-convex structure that is irregularly formed.

9. The integral optical plate of claim 1, wherein the adhesion element and the microlens sheet have refractive indices that are substantially the same.

10. A backlight assembly comprising:
    a light-emitting unit for emitting light; and
    an integral optical plate disposed over the light-emitting unit, for condensing and diffusing the light from the light-emitting unit, wherein the integral optical plate comprises:
    a convex lens plate having a first light incident surface facing the light-emitting unit and a first light-exiting surface disposed opposite the first light incident surface, a convex lens pattern being formed on the first light-exiting surface;
    a microlens sheet disposed on the first light-exiting surface having the convex lens pattern, a microlens pattern being formed on the microlens sheet; and
    an adhesion element disposed between the convex lens plate and the microlens sheet to combine the convex lens plate with the microlens sheet,
    wherein an air gap is formed between the convex lens plate and the adhesion element.

11. The backlight assembly of claim 10, wherein the convex lens pattern includes a plurality of convex lenses having a stripe shape that extends lengthwise along the convex lens plate.

12. The backlight assembly of claim 11, wherein the convex lens comprises:
    first and second inclined surfaces, a separation distance between the first and second inclined surfaces becoming narrower from lower ends to upper ends of the first and second inclined surfaces; and
    a curved surface for connecting the upper end of the first inclined surface to the upper end of the second inclined surface.

13. The backlight assembly of claim 11, wherein a cross-sectional surface substantially perpendicular to a longitudinal arrangement direction of the convex lens has one of a half-circular shape and a trapezoid shape.

14. The backlight assembly of claim 11, wherein the microlens sheet includes a second light incident surface facing the convex lens plate and a second light-exiting surface disposed opposite the second light incident surface, and the microlens pattern is formed on the second light-exiting surface.

15. The backlight assembly of claim 11, wherein the light-emitting unit includes a plurality of fluorescent lamps, each of the fluorescent lamps being disposed substantially in parallel under the integral optical plate.

16. The backlight assembly of claim 15, wherein the convex lenses extend substantially in a direction of a lengthwise direction of the fluorescent lamps.

17. The backlight assembly of claim 15, wherein the integral optical plate further includes a diffusion pattern, the diffusion pattern being formed on the first light incident surface to correspond to an arrangement of the fluorescent lamps.

18. The backlight assembly of claim 11, wherein the light-emitting unit includes a flat fluorescent lamp, wherein areas of the flat fluorescent lamp and the integral optical sheet are substantially the same.

19. A liquid crystal display (LCD) apparatus comprising:
    a backlight assembly having a light-emitting unit for emitting light, and an integral optical plate disposed over the light-emitting unit; and an LCD panel for displaying an image using the light from the backlight assembly, wherein the integral optical plate comprises:

a convex lens plate having a first light incident surface facing the light-emitting unit and a first light-exiting surface disposed opposite the first light incident surface, a convex lens pattern being formed on the first light-exiting surface and including a plurality of convex lenses having a stripe shape that extends lengthwise along the convex lens plate;

a microlens sheet having a second light incident surface facing the first light-exiting surface and a second light-exiting surface disposed opposite the second light incident surface, a microlens pattern being formed on the second light-exiting surface; and an adhesion element disposed between the first light-exiting surface and the second light incident surface, for combining the convex lens plate with the microlens sheet, wherein an air gap is formed between the convex lens plate and the adhesion element.

20. The LCD apparatus of claim 19, wherein the convex lens comprises:

first and second inclined surfaces, a separation distance between the first and second inclined surfaces becoming narrower from lower ends to upper ends of the first and second inclined surfaces; and a curved surface for connecting the upper end of the first inclined surface to the upper end of the second inclined surface.

* * * * *